Feb. 26, 1957  F. A. KROHM  2,782,444
WINDSHIELD WIPER BLADE
Filed Aug. 20, 1953

INVENTOR.
FRED A. KROHM
BY
Charles S. Penfold
ATTORNEY

United States Patent Office 2,782,444
Patented Feb. 26, 1957

2,782,444
WINDSHIELD WIPER BLADE

Fred A. Krohm, Hobart, Ind., assignor to Productive Inventions, Inc., a corporation of Indiana Application August 20, 1953, Serial No. 375,448

10 Claims. (Cl. 15—245)

This invention relates generally to windshield wiper blade unit construction, and more particularly is directed to the resilient wiper element thereof.

This application is a continuation-in-part of my copending application Serial No. 56,750, filed October 27, 1948, now abandoned.

One type of moulded wiper element currently in use includes a portion adapted for attachment to a backing or support, a wiper portion or head for wiping the surface to be cleaned, and a web or intermediate restricted portion joining the attaching portion and head whereby the head may pivot or flop to improve the wiping action. The range or arc of pivotal movement of the head relative to the remainder of the element of such type is predetermined and cannot be appreciably modified without affecting the efficiency of the element.

The thickness of the connecting web, with relation to its width, must be restricted so as to permit a high enough degree of flexibility to permit the wiper head to adapt itself readily to the surface to be wiped. If the web is too thick, and therefore too rigid, the wiping head does not contact the glass with sufficient uniformity, or move over the glass with sufficient freedom from irregularity, to provide maximum wiping efficiency.

The durability of the resilient wiping element and the period of time through which it retains its shape and consistency of performance, is determined largely by the capacity of the web for resisting oxidation and retaining its physical characteristics. In other words, the web is inclined to be the first thing to fail and may actually crack and sever itself lengthwise before deterioration in the balance of the element would disqualify it for satisfactory service.

This condition presented an obstinate problem. That problem was to provide sufficient thickness of the web to give it adequate resistance against oxidation, deterioration and failure, without at the same time impairing the wiping performance of the element.

It was discovered that this could be done by increasing the thickness and the width of the web (in effect increasing the length of its cross-section) to provide a construction which approximates the same flexibility and the same resistance against the tilting of the wiping portion of the element from side to side. In achieving this result it has been discovered that it is necessary to make the normal distance between the outer corners of the upper and lower sections of the wiping element normally of less distance apart than the width of the web, to prevent the head of the wiping element from tilting too far in operation and thus impairing its efficiency.

It has been found that the construction and arrangement shown in the drawings herewith (Figures 1 to 4, inclusive), in the manner suggested above, retains the efficiency of the element in performance while greatly extending the life of the web and therefore the life of the element, which is the principal object of the invention.

Resilient windshield wiper elements of the type shown and described, but with the recesses or slots adjacent the web having normally parallel sides and having outer openings normally substantially equal to the width of the web, provide the highest wiping efficiency ever attained in the art. As stated above, the purpose of this invention is to further increase the effective life of the wiping element described, without increasing the cost of production of the complete wiper blade assembly.

The principal object of the invention is to overcome this unfavorable condition by providing a web of increased thickness and width, without in any way materially affecting the prescribed range of pivotal movement or flop of the wiper head. More specifically in this respect, the side grooves defining the web of the subject element are so constructed and arranged that they are wider at a point adjacent to the web or transverse medial line of the element than adjacent the marginal sides of the element. Otherwise expressed, the width of the web is greater than the width of each groove adjacent the side of the element.

A further object of the invention is to provide an element of the character described in which flexibility of the attaching portion of the element is increased, and sensitive yieldable abutments or stops are provided for limiting the pivotal movement between the wiper head and attaching portion.

A particular object of the invention is to provide an elongated resilient one-piece wiper body having opposed grooves in its sides forming a movable wiping portion joined to the remainder of the body by a flexible web and in which the grooves form a pair of spaced abutments at each side of the body for determining the extent of movement of the wiping portion, the arrangement being such that the width of the grooves is greater adjacent the sides of the web than adjacent the sides of the wiper body.

Another object of the invention is to provide the resilient wiper body above referred to with an additional pair of grooves spaced from the first mentioned pair for receiving flexible supporting means constituting a backing or stay means for the wiper body, with means for detachably securing the flexible supporting means in said additional grooves.

A further object of the invention is to provide a resilient one-piece wiper body having a pair of recesses substantially dovetail in character with flexible supporting means secured therein in such a manner that abutments on the wiper head or portion of the body will alternately engage the supporting means in a manner whereby to assist in controlling the flop or tilt of the wiper head.

Other attributes of the invention reside in its simplicity, improved efficiency, and particularly its durability and ability to stand up when subjected to constant use for long periods of time.

Other advantages of the invention will become apparent after the description hereinafter set forth is considered in conjunction with the drawing annexed hereto wherein like parts or portions are designated by the same numeral.

Figure 1:
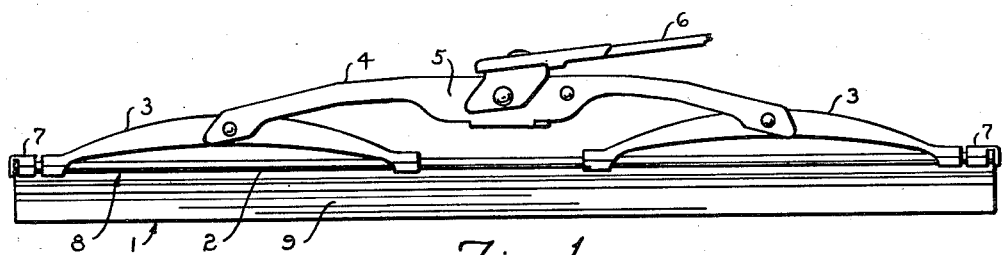
Figure 1 is a side view in elevation of a complete windshield wiper blade assembly.

The resilient wiper element generally designated 1 embodying the principles of design and construction of this invention, may be attached to any suitable backing or support, but as herein illustrated, it is carried by a flexible backing or stay means preferably comprised of a pair of corresponding yieldable substantially planar stays 2.

The blade unit comprised of element 1 and stays 2 may be operatively connected to a conventional wiper arm in any manner desired, but as herein illustrated, this is accomplished by a pressure distributing device comprised of a pair of corresponding yokes 3, the extremities of which embrace and slidably engage the stays 2, a bridge member 4 having extremities pivotally connected to intermediate points on the yokes, and a connector 5 on the bridge adapted for detachable connection with a wiper arm 6. The pressure distributing device is held in detachable association with the stay means by clips 7 detachably secured adjacent the extremities of the stays 2. These clips also serve to maintain the stays and resilient element assembled, and permit disassembly whereby a worn or damaged element may be replaced by a new one.

Figure 2:
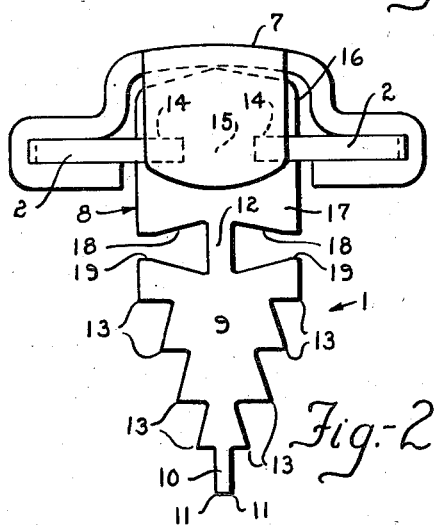
Figure 2 is an enlarged end view of the wiper blade unit illustrated in Figure 1.
Figure 3:
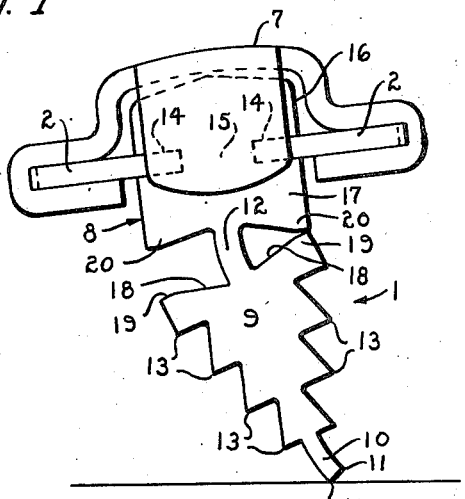
Figure 3 is an end view similar to Figure 2, illustrating an operative position of the wiping element of such unit.

The resilient wiper element as clearly exemplified in Figures 2 and 3, is preferably moulded in one piece and includes among other things, a portion 8 generally square in cross-section for attaching the element to the stay means, a wiper head 9 generally triangular in cross-section having a bendable lip 10 with wiping edges 11, and a web or intermediate restricted portion 12 pivotally joining the attaching portion and wiper head. The sides of the head may also be provided with wiping edges 13, one or more of which may, under certain conditions, also engage the surface to be cleaned.

The sides of the attaching portion 8 are preferably interrupted by a pair of corresponding longitudinal grooves or recesses 14 forming a neck 15. The stays 2 are seated in the grooves 14 with portions exposed for engagement by the yokes and clips above referred to. The construction is preferably such that portions 16 and 17 of the attaching portion 8 are respectively disposed above and below the general plane formed by the stays.

The web 12 is preferably formed by providing the sides of the element with a pair of substantially corresponding longitudinal dovetail-like grooves or recesses 18. The element is so designed and constructed that the width of the web is somewhat greater than the width of the grooves adjacent the sides of the element. With this improved arrangement the width and thickness of the web may be increased appreciably in order to promote the yieldability and flexation of the web as compared to a construction in which the grooves are substantially square or rectangular in cross-dimension. In other words, the size of the web may be increased to obtain greater efficiency without in any way affecting the prescribed range of pivotal movement of the wiper head 9, which range is primarily predetermined by the spacing between the attaching portion 8 and head 9 adjacent the sides of the element. More particularly in this respect, when the blade is operated to wipe a surface to be cleaned as illustrated in Figure 3, portions 19 on the head 9 may alternately engage corresponding yieldable abutments 20 provided on the attaching portion 8. It is to be noted that the portions 19 and abutments 20 are made more resilient due to their tapered shape resulting from the character of the grooves and shape of the material adjacent the wiping edges 13, and that such abutments and portions are preferably planar in character and arranged in parallel relation, the purpose of which is to more efficiently define or gauge the range of pivotal movement between the operative portions of the element. This arrangement assists in improving the wiping action because the movement of the wiper head is well cushioned as it flops against the abutments as the wiper blade unit is directed back and forth across the surface to be cleaned.

Figure 4:
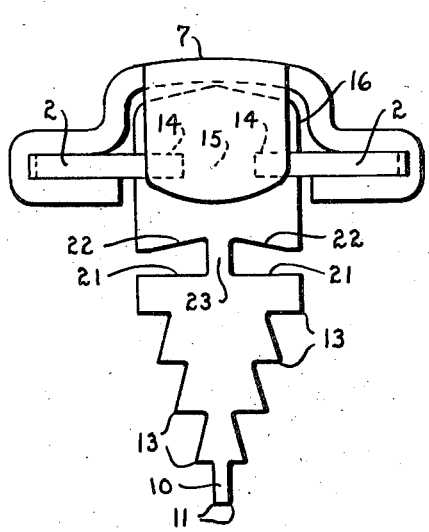
Figure 4 is an enlarged end view similar to Figures 2 and 3, illustrating a modified form of the invention.

In the modified construction exemplified in Figure 4 of the drawing, the grooves provided in the sides of the wiper element are of a different character. More specifically in this respect, the top marginal portions 21 of the wiper head are arranged in a single plane whereas the lower marginal portions 22 of the attaching portion are inclined. With this arrangement, the web 23 may be thickened and widened as in the preferred construction. The invention also contemplates a structure wherein the portions 22 are in a single plane and the portions 21 converge downwardly toward the medial line of the element.

Figure 5:
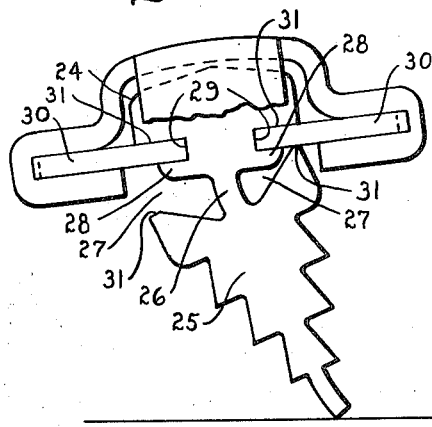
Figure 5 is an enlarged view showing another modified form of the invention.

The modification of the invention exemplified in Figure 5 of the drawing is similar to the other constructions in that the resilient wiping element of the blade is provided with a pair of recesses, substantially dovetail in character, and as pointed out as above these recesses are designed and constructed to receive flexible supporting means for the wiper body so that abutments provided on the body will alternately engage the supporting means when the blade is moved back and forth across a windshield to be cleaned.

More specifically in this regard, the elongated resilient one-piece wiper body illustrated in Figure 5 includes an attaching portion 24, a wiper head or portion 25 joined to the attaching portion by an intermediate web or hinge portion 26. This web portion is formed by providing the sides of the body with a pair of corresponding recesses 27 which are substantially dovetail in character. The body as clearly illustrated also is preferably provided with a pair of corresponding longitudinally extending ribs or fins 28 which are disposed within the confines of the recesses 27 so as to provide a pair of seats 29 which receive flexible supporting means preferably in the form of a pair of resiliently flexible members 30. The attaching portion and wiper portion are respectively provided with abutments 31.

The arrangement of the various portions of the resilient wiping body and the flexible supporting means is preferably such that the abutments 31 formed on the wiper head 25 will alternately engage the underside of the flexible supporting means as clearly shown in Figure 5, as distinguished from the arrangements illustrated in Figures 1 through 4 in which abutments on the wiping head of the resilient wiper body will alternately engage the attaching portion of the wiper body. It will be noted that the inner marginal portions of the flexible members 30 are located substantially in the seats 29 of recesses 27 and normally bear against the abutments 31 provided on the attaching portion of the wiper body.

The particular wiper blade assembly exemplified in the drawing is designed and constructed for use in wiping either a curved or straight surface, or combination of such surfaces, and consequently it is important that the size and shape of the various portions of the element be maintained as described within practical limits for efficient operation.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described and defined in the claims.

I claim:

1. An elongated resilient one-piece wiper body having opposed grooves in its sides forming a movable wiping portion joined to the remainder of the body by a flexible web, said grooves forming a pair of spaced abutments at each side of the body for determining the extent of movement of the wiping portion, the width of the grooves being greater adjacent the sides of the web than adjacent the sides of the body.

2. An elongated resilient one-piece wiper body having opposed grooves in its sides forming a movable wiping portion joined to the remainder of the body by a flexible web, said grooves forming a pair of spaced abutments at each side of the body for determining the extent of movement of the wiping portion, the width of the grooves being greater adjacent the sides of the web than adjacent the sides of the body, and a resiliently flexible support secured to said body.

3. An elongated resilient one-piece wiper body having opposed grooves in its sides forming a movable wiping portion joined to the remainder of the body by a flexible web, said grooves forming a pair of spaced abutments at each side of the body for determining the extent of movement of the wiping portion, the width of the grooves being greater adjacent the sides of the web than adjacent the sides of the body, said body also having an additional pair of grooves, and resiliently flexible means disposed in said additional grooves for supporting the body.

4. An elongated resilient one-piece wiper body having opposed grooves in its sides forming a movable wiping portion joined to the remainder of the body by a flexible web, said grooves forming a pair of spaced abutments at each side of the body for determining the extent of movement of the wiping portion, the width of the grooves being greater adjacent the sides of the web than adjacent the sides of the body, said body also having an additional pair of grooves, resiliently flexible means disposed in said additional grooves, and means for detachably securing the resiliently flexible means in said additional grooves.

5. An elongated resilient one-piece wiper body having opposed grooves in its sides forming a movable wiping portion joined to the remainder of the body by a flexible web, said grooves forming a pair of spaced abutments at each side of the body for determining the extent of movement of the wiping portion, the width of the grooves being greater adjacent the sides of the web than adjacent the sides of the body, said body also having an additional pair of grooves, a pair of supports disposed in said additional pair of grooves, and a pair of fasteners connected to the supports for holding the supports in said additional pair of grooves.

6. An elongated squeegee unit for use as a component of a wiper blade, comprising a unitary body having a longitudinal wiping portion and a longitudinal attaching portion joined by a longitudinally extending web providing a medial squeegee hinge section about which the wiping portion is laterally deflectible relative to the attaching portion; said web being defined by opposing, outwardly opening, coextensive grooves; the grooves being laterally tapered so that the outwardly opening portions of the grooves are of less extent than the inner web-defining groove portions, so that a relatively long flexible web is provided with the edges of the body bordering on the open portions of the groove being engageable with adjacent portions of the body to limit lateral deflection of the web.

7. In a one-piece windshield wiper squeegee having an elongated wiping portion and a support portion spaced therefrom, the improvement of a medial, relatively thin deflectible web interposed between and connecting said portions to accommodate limited lateral deflection of the wiping portion relative to the support portion, said web defining the inner walls of a pair of oppositely opening dovetail grooves formed in the squeegee, said grooves having restricted openings at the opposite lateral sides of the squeegee, the extent of lateral deflection of the wiping portion being limited by engagement of those portions of the squeegee which define the restricted opening on that side of the squeegee toward which the wiping portion is deflected.

8. In a windshield wiping element formed of an inherently resilient material and having a wiping edge laterally deflectible relative to a supporting portion, the improvement of a web joining said edge and said supporting portion and defined by a pair of laterally aligned grooves formed in the element intermediately the edge and the supporting portion, said grooves having their greatest transverse dimension forming the side walls of said web and tapering toward restricted open sides of less transverse dimension at the lateral margins of the element, those portions of the element bordering on the open sides of said grooves being abuttable to limit the deflection of said edge and the relatively great web-defining dimension of the grooves providing a web of increased size and which is subjected to a limited degree of distortion during edge deflection.

9. An elongated resilient one-piece body having longitudinally extending dovetail-like recesses in its sides forming a movable wiping portion joined to the remainder of the body by a flexible web, longitudinally extending seats disposed within the confines of the recesses, and supporting means for the body disposed in the recesses and engaging said seats.

10. The structure defined in claim 9, in which the wiping portion is provided with abutments adapted to alternately engage the supporting means for determining the extent of movement of the wiping portion.

References Cited in the file of this patent

UNITED STATES PATENTS 1,853,715     Anderson _____ Apr. 12, 1932

OTHER REFERENCES

Anderson Publication, Anderson Co., Gary, Ind., pages 2 and 3, November 1, 1946.